United States Patent [19]

Ives

[11] 4,368,790

[45] Jan. 18, 1983

[54] STATISTICAL WEIGHING

[75] Inventor: Donald C. A. Ives, Hemingford Grey, England

[73] Assignee: Danepak Limited, Norfolk, England

[21] Appl. No.: 229,089

[22] Filed: Jan. 28, 1981

[30] Foreign Application Priority Data

Dec. 29, 1980 [EP] European Pat. Off. ........ 80304730.7

[51] Int. Cl.$^3$ ...................... G01G 19/52; G01G 15/02
[52] U.S. Cl. .......................................... 177/50; 177/82
[58] Field of Search .................................. 177/50, 82; 209/592–596, 914

[56] References Cited

U.S. PATENT DOCUMENTS

| | | | |
|---|---|---|---|
| 3,593,813 | 7/1971 | Kitaba | 177/82 |
| 3,620,316 | 11/1971 | Henry et al. | 177/50 |
| 3,643,752 | 2/1972 | Blodgett | 177/50 X |
| 3,823,821 | 7/1974 | Wallace | 209/593 |
| 4,164,260 | 8/1979 | Blodgett | 177/50 X |

Primary Examiner—George H. Miller, Jr.
Attorney, Agent, or Firm—Robert R. Frailey

[57] ABSTRACT

In the retailing of articles it is necessary to ensure that packages containing a plurality of articles fall within predetermined weight ranges. The invention is particularly but not exclusively concerned with the packing of bacon but applies to other articles in which:

(a) predetermined weight of an article i.e. a slice of bacon is variable.

The packages aree weighed at a first weigh station to determine whether they fall within a predetermined weight range or whether they fall within predetermined limits either side of said predetermined weight range. If the latter the packages are then fed to a second weigh station at which they are again weighed and according to the weight ascertained there, an operator is given an indication usually by lights as to the exact number of make weight pieces both in number and size which have to be added or subtracted to the package in order that the package shall then fall accurately within the predetermined weight range. The second weigh station is desirably controlled by a computer which is supplied with basic information such as:

(a) the stated package weight
(b) the average number of articles per pack
(c) the predetermined make weight ranges and other factors.

10 Claims, 8 Drawing Figures

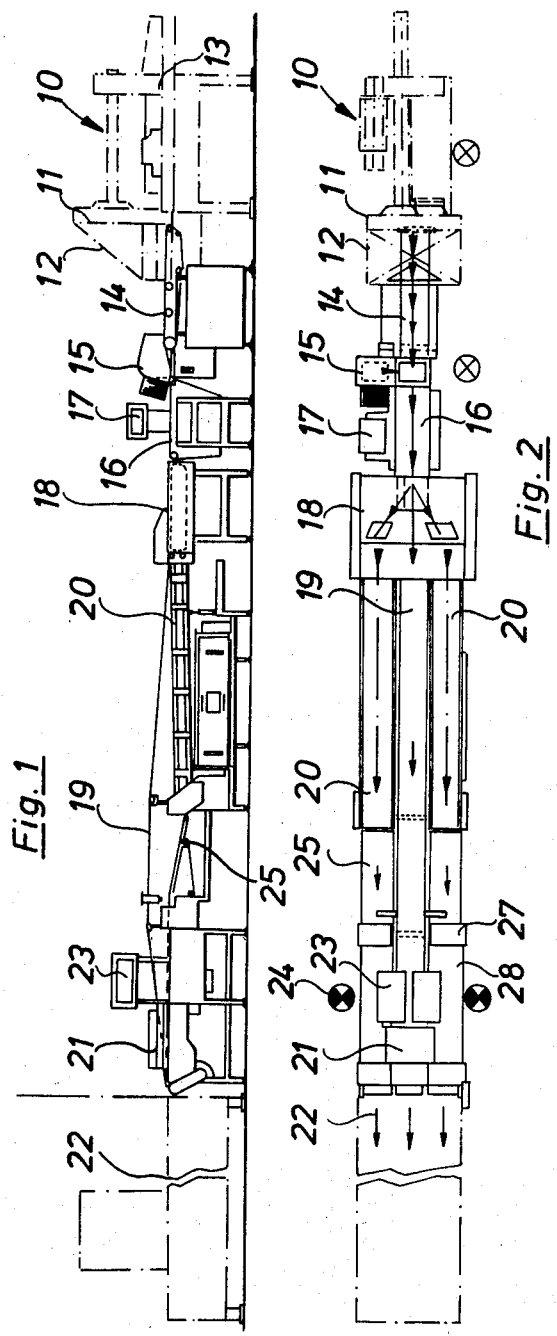

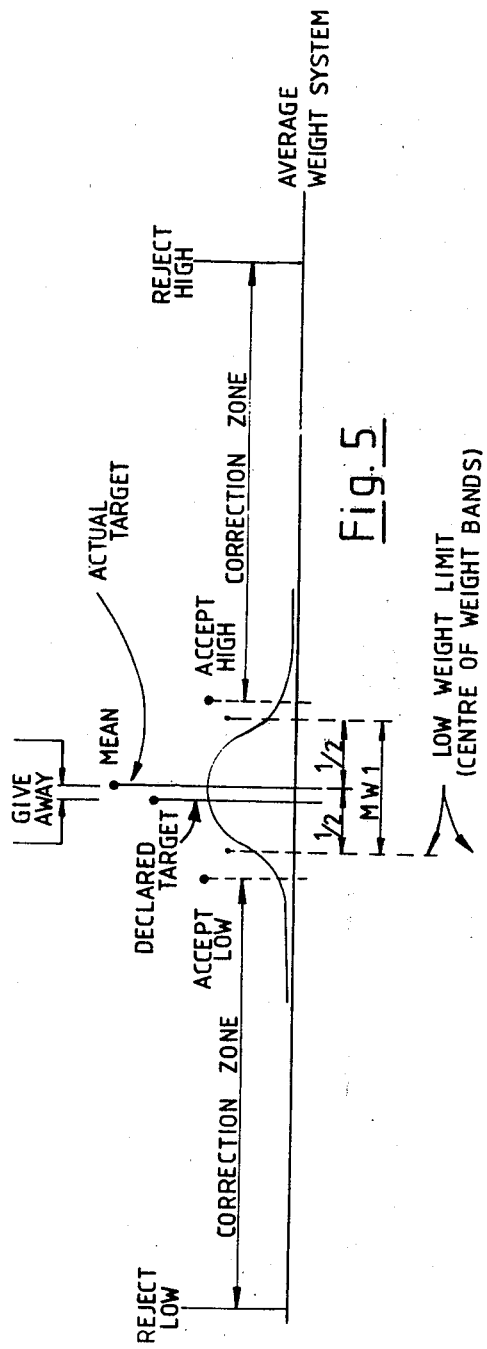
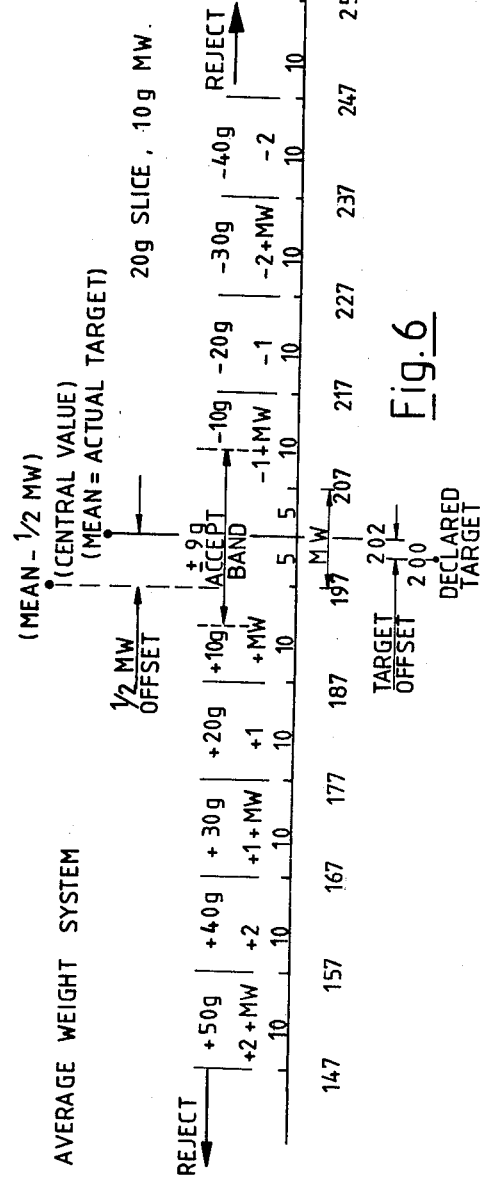

| NUMBER OF MAKE WEIGHTS | 1 | 2 | 3 | 4 |
|---|---|---|---|---|
| MAKE WEIGHT VALUES | 10g | 6 ⅓ g, 12 ⅔ g | 5g, 10g, 15g | 4g, 8g, 12g, 16g |
| MINIMUM GIVE AWAY | 5g (1·1%) | 3·2g (0·7%) | 2·5g (0·55%) | 2g (0·44%) |

STATISTICAL WEIGHING

It is known from U.S. Pat. No. 3,954,166 to provide means for slicing bacon into a shingle and to feed that shingle first to a weigh station to determine the approximate weight of the slices of the shingle which are to form a package falling within a predetermined weight range. It is known to feed those packages which fall accurately within said range direct to a packaging station and to feed those packages which do not fall within the predetermined weight range to a second weigh station and there to add or substract articles and then further to check weigh them in order to make final corrections and ensure that the packages fall within the predetermined weight range before delivery to the packaging station.

The present invention provides a method of packaging of articles to provide a package of a predetermined weight range which comprises a first weigh station means for feeding packages to said station to determine whether said packages are within said predetermined range or within predetermined limits above or below the said predetermined range, a second weigh station, means for feeding packages which are not within the predetermined weigh range to the second weigh station and means operable by said second weigh station to indicate to an operator the steps to be taken to ensure the packages fall within the said predetermined weight range.

Conveniently, in the slicing of bacon the side of bacon is cut by a bacon slicer and the slices deposited onto moving belts or bands forming a conveyor. Desirably the conveyor is provided with jump facilities so that after every predetermined number of slices have been deposited onto the conveyor the conveyor is temporarily accelerated so as to separate the last slice deposited on the conveyor from the next slice deposited. Thus the slices are deposited onto the conveyor into discrete units or packages of approximate predetermined weight. For example, it may be determined that in order to fulfil packages of bacon in a predetermined weight range, six slices are required. After the sixth slice has been deposited the conveyor is temporarily accelerated so as to widen the gap on the conveyor between the sixth slice of the first pack and the first slice of the succeeding pack.

The packages of bacon are then deposited onto a second conveyor at which they are weighed, this being designated the first weigh station. If the packages fall within a predetermined weight range as set by means associated with said weigh station the packages are fed down a central line to a packaging station and are not further weighed. If, however, the units of bacon at the first weigh station fall within predetermined limits above or below the said predetermined weight range then they are fed to a second conveyor and conveyed to a second weigh station. At the second weigh station a computer is provided to read the weight of the package and data are fed into a computer which indicates to an operator exactly what must be done to that package of bacon in order to bring it within the said predetermined weight range. For example, it may be necessary to add a small make weight piece, it may be necessary or desirable to remove some of the slices from the package.

Lights controlled by the computer at the said second weigh station provide for clear indication to an operator as to exactly what has to be done. However, means other than lights may be utilised. At the second weigh station the operator will be provided with a predetermined number of different make weight pieces and the number and weight range of said make weight pieces will determine the indication given by the computer controlling the said second weigh station. In particular the computer will be provided with information as to the stated package weight, that is the desired weight for the finished package. The computer will also be provided with the average slice count per pack. This may be any desired number according to the desired weight of the package and the weight of the bacon being sliced. The computer will also be provided with information concerning the number and weight of the make weight pieces. Desirably the make weight pieces will themselves be of weights approximating to whole fractions of the average slice weight. For example, if the average slice weight is 20 grams then if only one make weight piece is utilised this will be 10 grams, if two make weight pieces are used then desirably one make weight will be 6.1/3 grams and another 12.2/3 grams while if three make weight pieces are used one will be 5 grams, another 10 grams and a third 15 grams. On the other hand if four make weight pieces are used then they will have weights of 4, 8, 12 and 16 grams so that the whole number of make weight pieces themselves together will weigh the same as one slice or other weight ranges.

Finally the computer will be fed with a factor hereinafter referred to as the K factor which factor is determined according to the variation in whole slice weight.

It will be appreciated that the actual package weight divided by the number of whole slices i.e. the slice count is not constant. Also the weight of a slice varies due to various factors such as the side of bacon itself. Accordingly, a factor K has to be determined to adjust for these variables.

The K factor should be defined in terms of the range of slice weight encountered in using the equipment. Thus if the slices are found to range from 18 to 22 grams for a mean of 20 grams the range is + or −2 grams and K is 2/20=0.1. In general if the slice weight varies from (mean−X) to (mean+X) then K=X/(mean).

It will be appreciated that in the packaging of bacon that it is necessary to satisfy National Government requirements as to the minimum of weight of a declared package.

Thus it would be uneconomical for a packer of foodstuffs to be giving away more bacon than is necessary i.e. to have the actual weight of his declared packages (actual target weight) in excess of the declared target weight required by regulation or otherwise by more than the minimum necessary to meet official requirements.

Accordingly, in the packaging of bacon the invention provides for:
(1) determining the declared target weight;
(2) determining an actual target weight which weight is higher than the declared target weight;
(3) determining an average slice count per pack;
(4) determining the average slice weight;
(5) determining the K factor as hereinbefore defined;
(6) determining the number and weight of the make weight pieces;
(7) determining the range of weights above or below relative to the actual target weight (accept band);
(8) ascertaining the give away range being the difference between the mean value of the accept band and the declared target weight.

Reference is now made to the accompanying drawings, in which:

FIG. 1 is a side elevation of a line of bacon packaging incorporating the method of the present invention;

FIG. 2 is a plan view thereof;

FIG. 5 is a graph showing the declared targets weight and mean weight ranges for an average weight system;

FIG. 6 is a statistical analysis of the graph of FIG. 5; and

Figure 4:
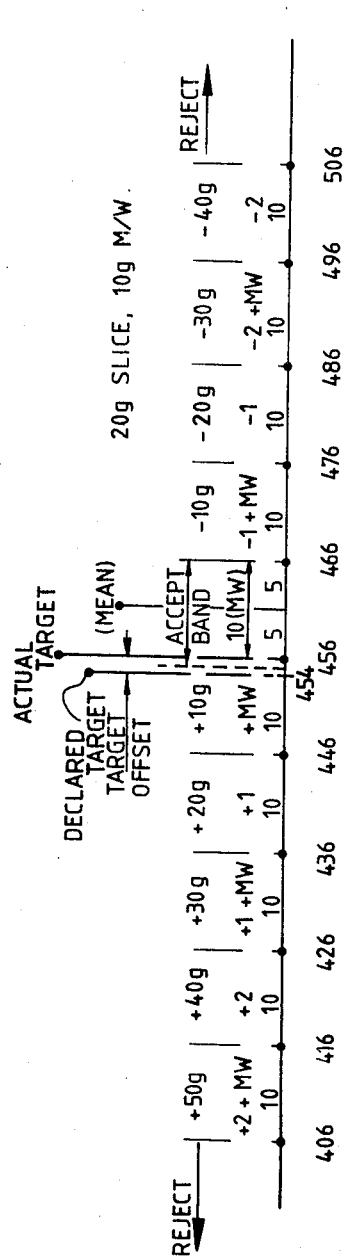
FIG. 4 is a statistical analysis of the graph of FIG. 3.

Referring firstly to FIGS. 1 and 2, a bacon slicing machine 10 comprises a rotating cutter 11 in a safety housing 12 and provided with a table 13 including a ram for directing a side of bacon to the cutter 11. The rotating cutter 11 slices the bacon and deposits the slices onto belts of a moving conveyor 14. The slices of bacon are desirably separated into packages of approximate desired weight by the provision of jump facilities of the conveyor 14. That is to say, after a given number of slices have been cut and deposited onto the conveyor 14, the conveyor is temporarily accelerated in order to increase the distance between the last slice deposited in one package and the first slice of the succeeding package.

The packages of bacon are provided with a card from a card dispenser 15 and then fed to a first weigh station 17 on a conveyor 16. At this station fingers of a weigh pan move upwardly between the bands of the conveyor and temporarily halt the forward movement of the package. In some type of weigh systems the package movement is not halted and weighing takes place while the package is moving along the conveyor. The slices are then weighed and the weight read and recorded at weigher 17. If the packages at this stage fall within the predetermined target weight range as set at the weigh station 17 then the packages are fed down a central conveying line 19 to a packaging location 22. If on the other hand, the weight determined by the weigh station 17 is such that the packages of bacon are not within the predetermined target weight range and are either above or below it they are then fed alternatively to the left and right of the central conveyor 19 and down conveyors 20. Desirably, the conveyors 20 are double banked, i.e. upper and lower conveyors thus providing a storage facility for reasons hereinafter referred to. Conveyor 25 collects the packages from the conveyors 20 and feeds them to a second weigh station 28. At the second weigh station 28 the packages are again weighed and the information fed to a computer to provide a reading on an indicator panel 23. The indicator below panel 23 will comprise of a plurality of lights indicating to an operator who may be seated on a stool 24 opposite a make weight piece tray 21 or otherwise located at the station, the number of make weight pieces and/or whole slices to be added to or subtracted from the package in order for the package to fall within the predetermined target weight range. The operator will add to the packages the requisite make weight pieces from the tray 21 and will remove slices from packages to said tray 21 if so instructed according to the lights on panel 23.

The double bank conveyors 20 provide for a continuous feed to the operators at 24 because it will be appreciated that a number of the packages will have passed down the line 19 and also there are interruptions in the feeding from the slicer 10 as after each side of bacon has been sliced an operator at that locality is obliged to obtain another side and place it onto the platform 13.

Thus in order to provide a continuous supply of packages at weigh station 28 the conveyors 20 are double banked. Conveyor 25 will select packages from either the upper or the lower bank of the conveyors 20 according to which one is filled with packages.

The second weigh station 28 is controlled by the computer and information is fed into said weigh station as hereinbefore described.

Figures 7, 8:
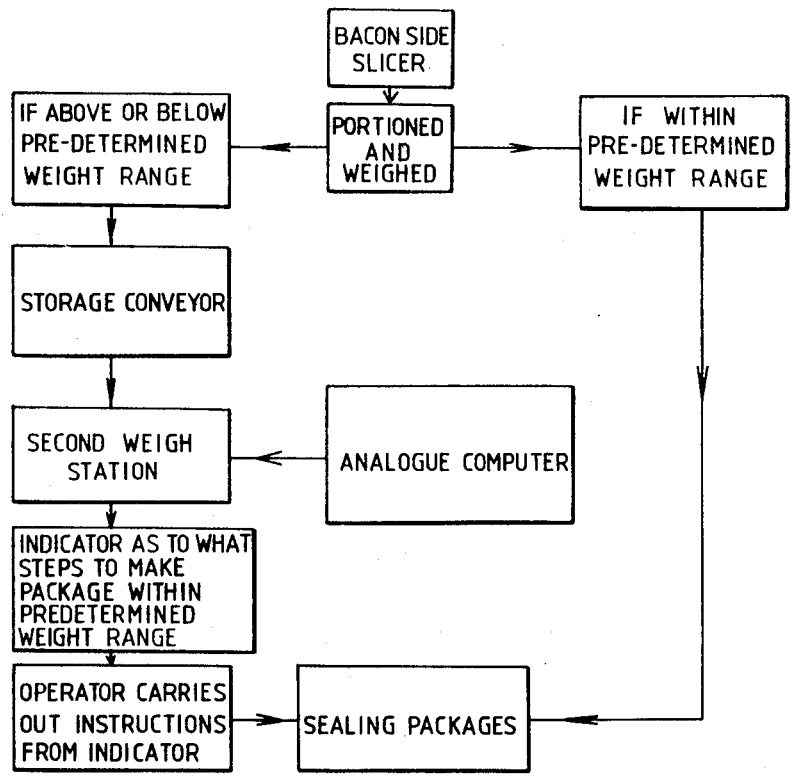
FIG. 7 is a table of give away amounts for different make weight pieces.
FIG. 8 is a diagrammatic block flow diagram.

A block flow diagram of the statistical weighing method according to this invention is illustrated in FIG. 8 where the narrative in each block describes the process and operation carried out or performed by that block.

If it is desired to weigh according to a minimum weight system, that is to say if the government requirements prohibit the sale of articles which are less than a predetermined weight then the minimum weight system has to be adopted. If articles are sold below that minimum weight then the supplier of those articles may be liable to prosecution.

Figure 3:
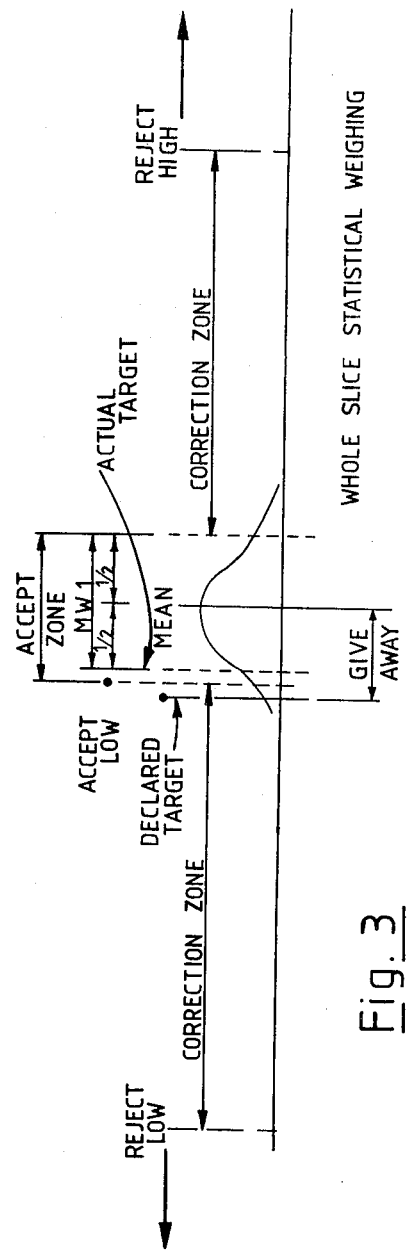
FIG. 3 is a graph showing the give away range and accept bands for a minimum weight system.

In the instance illustrated in FIGS. 3 and 4 the operator firstly determines the declared target weight which may be 454 grams and adds a target offset of 2 grams to provide an actual target weight of 456 grams to allow for error.

In the instance of FIGS. 3 and 4 it is assumed that the average slice weight is 20 grams per slice and make weight of 10 grams make weight pieces each are utilised.

The accept band is determined by the width of the make weight and thus extends between 455 grams and 465 grams. Thus, for anything over 466 grams the operator will be instructed to remove a whole slice making the package weight then 446 grams and to add one make weight piece bringing it back to 456 grams. If on the other hand the weight determined at the second weigh station is less than the 456 grams the operator will be instructed to add a make weight piece bringing it up to the 456 and in excess thereof. Thus, all the packages will have a weight in the range between 456 and 466 grams. Since the mean of that range is 461 grams this is determined as the mean of the accept band. Since the declared target is 454 grams there is an average give away of 7 grams per package. The Example of FIG. 4 is correct for a whole slice weight of 20 grams and a make weight of 10 grams. In fact each whole slice will not weigh exactly 20 grams nor will each make weight peice weigh exactly 10 grams.

It will be understood that actual weight of the whole slice or make weight cannot be altered. Therefore in order to bring each package to the actual target weight the points (i.e. actual package weights) at which the known weight of make weights or whole slices have to be added or subtracted is determined according to the K factor. Thus for the underweight packages the points for adding whole slices or make weight pieces is adjusted from the figures shown in FIG. 4 by the factor $(1-K)$. Similarly for the overweight packages the points for subtracting slices is adjusted by the factor $(1+K)$.

This example applies when the national legislation requires all the packages to be above the declared target weight. However, some national legislations now provide for an average weight system and the graph and statistics of this system are illustrated in FIGS. 5 and 6.

The declared target may be 200 grams and the actual target is displaced higher by 2 grams at 202 grams to compensate for possible error. In the average weight system a supplier of packages is permitted to sell packages which are within an accept band above and below the declared target providing that the number of packages which are below the declared target are themselves within predetermined percentage of the total number of packages sold. In this instance the whole slice weight is assumed to be 20 grams and the make weight is half that i.e. at 10 grams.

The accept band is set to be 9 grams either side of the actual target of 202 grams so that the acceptable weight range of packages will be 9 grams either side of 202 grams i.e. they will fall within the weight range between 193 grams and 211 grams and if the package falls within this weight it will be passed to the packaging station and no lights will be illuminated on the panel 23 of the second weigh station.

If on the other hand the package is above 211 grams then the lights will indicate the removal of one whole slice and the addition of a make weight piece 10 grams i.e. the removal of 10 grams of weight from the package. If on the other hand, the package weighs less than 193 grams it will indicate the addition of 10 grams i.e. one make weight piece.

It will be seen from FIG. 5 therefore that the give away is now the difference between the declared target of 200 grams and the mean of the accept band i.e. 202 grams and thus the percentage give away is now substantially less. By using more than one make weight piece it is possible to reduce the amount of give away and FIG. 7 is a table showing the minimum give away which is applicable both to average weight slice and systems for the different number of make weight pieces and their relative values. As with the minimum weight system of FIGS. 3 and 4 the K factor has to be determined and applied to vary the points at which the make weight or whole slices are added or subtracted. In both systems the value of the K factor is supplied to the computer controlling the second weigh station and the lights on panel 23.

It will be appreciated that the present invention provides a remarkable advance in the process of statistical weighing for packages which are composed of a number of articles of a varying weight themselves and in which particularly the actual target weight will not be a whole number of the average weight of those slices times the number of slices themselves.

It will be appreciated that the present invention provides a method of statistical weighing which is applicable both to average weight and minimum weight systems thus conforming to the requirements of different national laws and that the invention is equally applicable and is applicable to many other types of articles which have to be weighed and packed and put into packages of a declared target weight other than bacon. The example of bacon slices is merely one example only and is to be construed as such of the inventive concept of this invention.

I claim:

1. An apparatus for packaging articles to provide a package of a predetermined weight range which comprises a first weigh station, means for feeding packages to said station to determine whether said packages are within the said predetermined range or whether within predetermined limits above or below the said predetermined range, a second weigh station, means for feeding the packages which are not within said predetermined weight range to the second weigh station and means operable at said second weigh station to indicate to an operator the steps to be taken to ensure that the packages fall within said predetermined weight range, said means operable at said second weigh station being controlled by a computer which is supplied with:
   (a) a stated pack weight,
   (b) the average slice count per pack,
   (c) predetermined make weight (plus or minus) ranges and
   (d) a (k) factor as herein defined.

2. An apparatus according to claim 1 wherein the means operable at said second weigh station is operative to indicate to an operator whether to add or subtract predetermined articles or portions thereof in order that said packages weigh within said predetermined weight range.

3. An apparatus according to claim 2 in which said means operable at said second weigh station include lights or other indicators indicating to the operator whether to add or subtract and in what amounts.

4. An apparatus according to claim 1 in which said computer determines the points (actual package weight) at which the make weight pieces are to be added or subtracted to make the package weigh to the declared target weight according to the (k) factor.

5. A method of packing bacon into packages of a predetermined given weight which comprises:
   (1) determining the declared target weight
   (2) determining an actual target weight being a weight higher than the declared target weight
   (3) determining an average bacon slice weight
   (4) determining the number and weight of given make weight pieces
   (5) determining the (k) factor as herein defined
   (6) determining the range of weights above and below the actual target weight which is acceptable for the predetermined package weight (accept band)
   (7) and ascertaining the giveaway weight range being the difference between the mean value of the accept band and the declared target weight.

6. In a method of preparing packages falling within a predetermined weight range, said packages including a quantity of discrete articles of like composition, the steps comprising:
   (a) providing a plurality of said packages, each package comprising the same quantity of discrete articles of approximately the same weight and size,
   (b) weighing seriatim the packages at a first weigh station to determine whether said packages are within the said predetermined weight range,
   (c) advancing weighed packages which fall within the predetermined weight range to another station for further packaging and advancing weighed packages which do not fall within the predetermined weight range to a second weigh station,
   (d) weighing seriatim the second mentioned weighed packages which do not fall within the predetermined weight range at the second weigh station to ascertain the amount by which the weight of each said package falls short of, or exceeds, the predetermined weight range, (e) calculating automatically the correction required to be made to each said package to bring said package within the predetermined weight range and (f) based on such calculations, instructing automatically an operator either to add articles or portions thereof to the said package, or to remove articles or portions thereof from said package, thereby to bring the weight of the package within the predetermined weight range.

7. In a method of preparing packages falling within a predetermined weight range, said packages including a quantity of individually sliced articles of like composition, the steps comprising:

(a) providing a plurality of said packages, each package comprising the same quantity of sliced articles of approximately the same weight and size, (b) weighing the packages at a first weigh station to select those packages which are not within said predetermined weight range, (c) then advancing the packages which are not within the predetermined weight range to a second weigh station, (d) weighing said packages at the second weigh station to ascertain the amount by which the weight of each package falls short of, or exceeds, the predetermined weight range, (e) providing a quantity of make weight pieces of a range of weights less than the average weight of the sliced articles, (f) providing a computer to calculate the correction required to be made to each package to bring each said package within the predetermined weight range, (g) activating the computer to calculate the corrections and to provide instructions to an operator and (h) based on such calculations, instructing an operator either to add make weight pieces to, or to remove sliced articles from, or to remove sliced articles from and then add make weight pieces to, the said package in order to bring the weight of the package within the predetermined weight range.

8. A method according to claim 7, wherein each package constitutes a shingle of sliced bacon and the make weight pieces constitute selected portions of a slice of bacon.

9. A method according to claim 7, further including the step of instructing the operator by visual indicating means whether to add make weight pieces to, or remove articles from, or remove articles from and add make weight pieces to, the said package.

10. A method according to claim 7, further including the step of feeding the following data to the computer:

(a) a desired weight for each package, (b) a selected quantity of sliced articles per package, (c) predetermined make weight ranges for the make weight pieces and (d) a K factor determined according to the equation $K = X/(Mean)$, where the term "Mean" indicates the average weight per article of the sliced articles in a package and X indicates the weight range of the sliced articles in a package above and below the Mean.

* * * * *

UNITED STATES PATENT AND TRADEMARK OFFICE
CERTIFICATE OF CORRECTION

PATENT NO. : 4,368,790
DATED : January 18, 1983
INVENTOR(S) : Donald C.A. Ives

It is certified that error appears in the above—identified patent and that said Letters Patent are hereby corrected as shown below:

Column 4

Line 32, after "weight", first occurrence, insert --pieces--;

after "weight", second occurrence, delete --pieces--

Signed and Sealed this

Fifth Day of April 1983

[SEAL]

Attest:

GERALD J. MOSSINGHOFF

Attesting Officer     Commissioner of Patents and Trademarks